United States Patent
Lin

(10) Patent No.: US 11,114,879 B2
(45) Date of Patent: Sep. 7, 2021

(54) SMART CHARGING METHOD

(71) Applicant: CHEN-SOURCE INC., Taoyuan (TW)

(72) Inventor: Cheng-Jen Lin, Taoyuan (TW)

(73) Assignee: CHEN-SOURCE INC., Taoyuan (TW)

( * ) Notice: Subject to any disclaimer, the term of this patent is extended or adjusted under 35 U.S.C. 154(b) by 241 days.

(21) Appl. No.: 16/391,763

(22) Filed: Apr. 23, 2019

(65) Prior Publication Data

US 2020/0343734 A1 Oct. 29, 2020

(51) Int. Cl.
*H02J 7/00* (2006.01)
*H02H 9/02* (2006.01)

(52) U.S. Cl.
CPC ............... *H02J 7/007* (2013.01); *H02H 9/02* (2013.01); *H02J 7/0029* (2013.01); *H02J 7/00304* (2020.01)

(58) Field of Classification Search
CPC ...... H02J 7/007; H02J 7/0029; H02J 7/00304; H02J 3/14; H02H 9/02; H02H 3/025
USPC ................ 320/134, 157, 158, 160, 162, 163
See application file for complete search history.

(56) References Cited

U.S. PATENT DOCUMENTS

| 2012/0173033 A1* | 7/2012 | Tischer | H02J 7/0047 700/295 |
| 2015/0349580 A1* | 12/2015 | Chou | H02J 7/00716 320/111 |
| 2017/0279273 A1* | 9/2017 | Tischer | H02J 3/14 |

* cited by examiner

Primary Examiner — Edward Tso
Assistant Examiner — Aaron Piggush
(74) Attorney, Agent, or Firm — Muncy, Geissler, Olds & Lowe, P.C.

(57) ABSTRACT

A smart charging method can supply a charging device with power, and the charging device includes charging regions disposed inside thereof, and each charging region includes sockets for charging mobile electronic devices. The charging device includes a control circuit to perform automatic charging control on the mobile electronic devices plugged into the charging regions. During process of the automatic charging control, inrush current is filtered out, and when the total current required by at least two charging regions is higher than a maximal current supply value, the at least two charging regions take turn to charge for a first charging period; otherwise, the charging regions satisfying the condition, and remaining charging region can take turn to charge for a second charging period until the mobile electronic devices are fully charged. The smart charging method can filter out inrush current and effectively increase the charging efficiency.

6 Claims, 2 Drawing Sheets

SMART CHARGING METHOD

BACKGROUND OF THE INVENTION

1. Field of the Invention

The present invention provides a smart charging method, more particularly to a smart charging method applied to a charging device to filter out inrush current, so as to effectively increase charging efficiency to shorten charging period of a mobile electronic device.

2. Description of the Related Art

In recent years, with rapid development of electronic technology and multimedia information, electronic products such as smart phones, tablet computers, and notebook computers are designed toward light, short, and powerful functions to have features of smaller size, lighter weight, and easy carry, and software and hardware of the electronic products are also continuously innovated, so that the electronic products can be used more flexibly and have improved practical effects, and become indispensable devices widely applied in people's work and life entertainment.

However, as the processing speed of the electronic product is improved, the mobile electronic device such as smart phone, tablet computer or notebook computer consumes more power. As a result, when a user operates a mobile electronic product while walking, the battery power of the mobile electronic device is quickly exhausted, and the user needs to find a power socket to charge the battery of the mobile electronic device.

In teaching environment (for example, schools), in order to meet the requirement in digital teaching, teachers and students use mobile electronic devices, such as tablets or notebooks, to replace traditional books for knowledge transfer, so how to conveniently charge the mobile electronics becomes extremely important. Generally, a charging device, such as a charging cabinet or a charging car, can provide a plurality of AC sockets or DC charging sockets, such as USB sockets, disposed thereon to charge the mobile electronic devices through necessary chargers and charging lines. Since a power distribution system of the charging device is possibly overloaded when dozens of mobile electronic devices are charged on the charging device at the same time, the charging device is separated into multiple charging regions, and the mobile electronic devices electrically connected to the charging regions are repeatedly charged by turns, region by region, thereby preventing the power distribution system from overloading. However, when the charging regions are supplied with power by turns, region by region, the charging completion periods of the mobile electronic devices are undesirably delayed. Therefore, how to develop a fast and efficient smart charging device to solve above problems is a key issue in the industry.

SUMMARY OF THE INVENTION

Therefore, in order to solve the above-mentioned problems and defects, the inventors develop a smart charging method according to collected data, tests and modifications, and years of research experience.

An objective of the present invention is to provide a smart charging method which can use a domestic power source to supply a charging device with power, and the charging device comprises a plurality of charging regions, and each charging region comprises a plurality of sockets configured to charge a plurality of mobile electronic devices, and the charging device can include a control circuit to perform automatic charging control on the mobile electronic devices plugged into the charging regions. During a process of the automatic charging control, inrush current is filtered out first, current sensors are used to obtain a value of total current required by the charging regions, the value of the total current is compared with a maximal current supply value, and when the value of total current required by at least two charging regions is higher than maximal current supply value, the at least two charging regions take turn to perform charging for a first charging period. When the value of total current required by at least two charging regions is less than the maximal current supply value, the charging regions satisfying a condition and remaining charging region can take turn to perform charging for a second charging period until the mobile electronic devices are fully charged. As a result, the smart charging method of the present invention can filter out inrush current, and effectively increase the charging efficiency to shorten the charging periods of the mobile electronic devices.

Another objective of the present invention is that an inrush current prevention circuit can comprise an inrush switching relay and an inrush current absorber, and when the inrush switching relay is switched to electrically connect to a contact having the inrush current absorber, and after the inrush current absorber absorbs inrush current for a period, the inrush switching relay is switched to another contact not having the inrush current absorber, to perform the charging operation.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENTS

Figure 1:
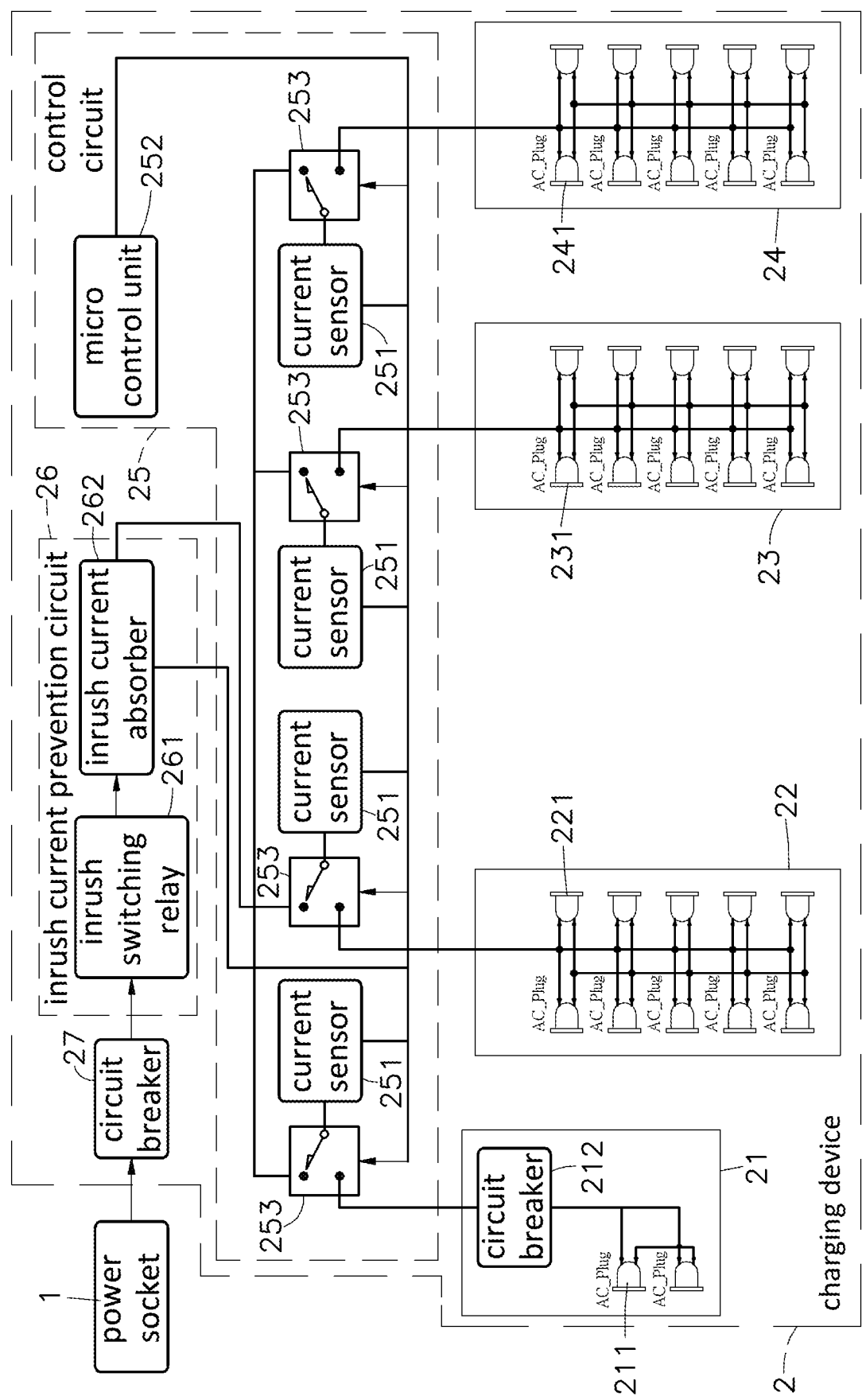
FIG. 1 is a functional block diagram of circuit of a charging device of the present invention.

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be acknowledged that although the terms 'first', 'second', 'third', and so on, may be used herein to describe various elements; these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the word "comprise" and variations such as "comprises" or "comprising" will be acknowledged to imply the inclusion of stated elements but not the exclusion of any other elements.

Please refer to FIG. 1, which is a function block diagram of circuit of a charging device of the present invention. As shown in FIG. 1, circuit components of the charging device of the present invention can include a power socket 1 and a charging device 2. The charging device 2 includes a first charging region 21, a second charging region 22, a third charging region 23, a fourth charging region 24, a control circuit 25, an inrush current prevention circuit 26 and a circuit breaker 27. Functions and operations of the circuit components are described in following paragraphs.

The charging device 2 can be supplied with power from a domestic power source such as alternating current (AC) power source, through the power socket 1. In an embodiment, the charging device 2 can be a charging cabinet or a charging car, and the difference between the charging cabinet and the charging car is that the charging cabinet is a charging device fixed at a predetermined location, and the charging car is a mobile charging device. The charging device can include a plurality of charging regions, including the first charging region 21, the second charging region 22, the third charging region 23 and the fourth charging region 24. Each of the charging regions (21, 22, 23, 24) includes a plurality of sockets (211, 221, 231, 241). The sockets (211, 221, 231, 241) are configured to charge a plurality of mobile electronic devices (not shown in FIG. 1), such as tablet computers, notebook computers or smartphones. The charging device 2 includes a control circuit 25 configured to perform automatic charging control on the mobile electronic devices plugged in the charging regions (21, 22, 23, 24). The charging device 2 includes an innish current prevention circuit 26 disposed between the power socket 1 and the control circuit 25 and configured to absorb inrush current, which is also called as pulse current, so as to ensure that the electronic components in the charging device 2 is protected from being burned out by inrush current.

The first charging region 21 is provided with a circuit breaker 212 disposed between the socket 211 and the control circuit 25, and the circuit breaker 212 has a maximal withstand current value of 4 amps (A). In a preferred embodiment, the first charging region 21 can be disposed on an outer part of the charging device 2, and can perform the charging operation with a higher priority.

The control circuit 25 can comprise a plurality of current sensors 251, and a plurality of overload relays 253 which each is electrically connected between each of the current sensors 251 and each of the charging regions (21, 22, 23, 24). The current sensors 251 and the overload relays 253 are electrically connected to a micro control unit 252, to form the control circuit 25.

The inrush current prevention circuit 26 can comprise an inrush switching relay 261 and an inrush current absorber 262. When the inrush switching relay 261 is switched to electrically connect to the contact having the inrush current absorber 263, and after the inrush current absorber 262 absorbs inrush current for a period, the inrush switching relay 261 is switched to another contact not having the inrush current absorber 262, to perform the charging operation. In an embodiment, the inrush current absorber 262 can comprise at least one negative temperature coefficient resistor or filter capacitor.

The circuit breaker 263 disposed between the power socket 1 and the innish current prevention circuit 26 can include a fuse or knife switch, and have a maximal withstand current value in a range of 10 amps (A) to 12 amps (A).

Figure 2:
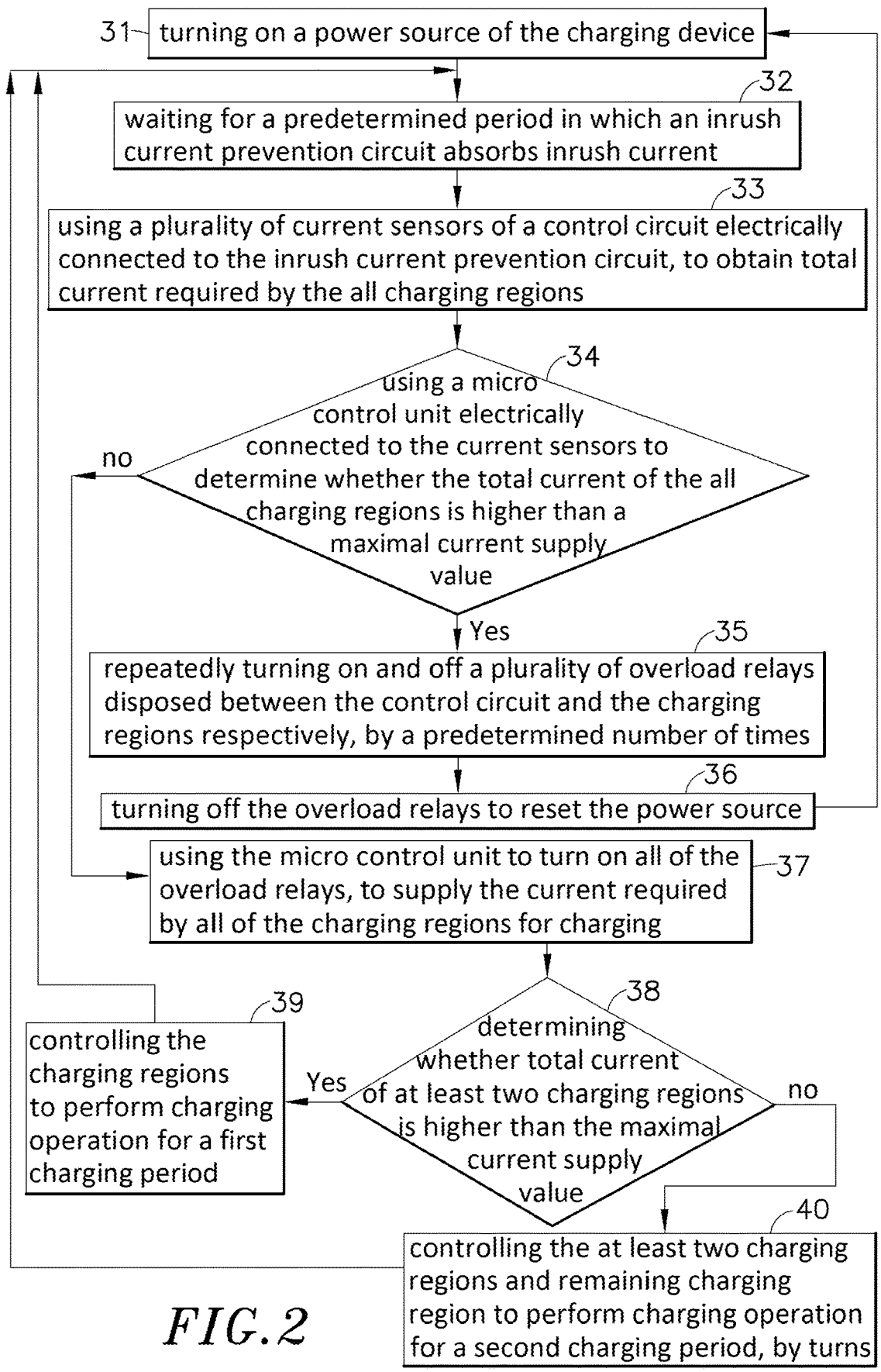
FIG. 2 is a flowchart of a smart charging method of the present invention.

Please refer to FIG. 2, which is a flowchart of a smart charging method of the present invention. The smart charging method includes steps 31 to 40.

In a step 31, the power source of the charging device is turned on.

In a step 32, the charging device waits for a predetermined period in which the inrush current prevention circuit absorbs inrush current. In a preferred embodiment, the predetermined period is in a range of 400 milliseconds (ins) to 500 milliseconds (ms).

In a step 33, a plurality of current sensors of a control circuit electrically connected to the inrush current prevention circuit are used to obtain a value of total current required by the all charging regions.

In a step 34, a micro control unit, which is electrically connected to the current sensors, can determine whether the value of total current required by the all charging regions is higher than a maximal current supply value, and when the value of total current is higher than the maximal current supply value, the step 35 is performed; otherwise, the step 37 is performed. In an embodiment, the maximal current supply value is in a range of 12 amps (A) to 15 amps (A).

In a step 35, a plurality of overload relays, which are disposed between the control circuit and the charging regions respectively, are repeatedly turned on and off by a predetermined number of times. In a preferred embodiment, the way of turning on and off the overload relays by the predetermined number of times is that the overload relays are turned on for 1 second and turned off for 3 seconds, and this operation is repeated by 20 times.

In a step 36, the overload relays are turned off for resetting the power source, and the step 31 is performed.

In a step 37, the micro control unit turns on the all overload relays, to supply current required by the all charging regions for performing charging operation.

In a step 38, the value of the total current required by at least two charging regions is determined whether to be higher than the maximal current supply value, and when the value of the total current required by at least two charging regions is higher than the maximal current supply value, the step 39 is performed; otherwise, the step 40 is performed.

In a step 39, the charging regions take turn to perform the charging operation for a first charging period, and the step 32 is then performed. In an embodiment, the first charging period can be in a range of 40 minutes to 50 minutes, and can be 45 minutes preferably.

In a step 40, the at least two charging regions, of which the total current is less than the maximal current supply value, and remaining charging region take turn to perform the charging operation for a second charging period, and the step 32 is performed again. In a preferred embodiment, the second charging period can be in a range of 20 minutes to 40 minutes, and can be 30 minutes preferably.

An example is described for illustrating the above steps 38 to 40. When the charging current required by the first charging region is 5 amps (A) and the charging current required by each of the second, third, and fourth charging regions is 8 amps (A), the total current required by at least two charging regions (such as 5+8=13 or 8+8=16) is higher than the maximal current supply value of 12 amps (A), so that the step 39 is performed to make the charging regions take turn to perform charging operation for the first charging period. After the four charging regions are charged by turns, the charging currents required by the first to fourth charging regions are 3 amps (A), 5 amps (A), 5 amps (A), 5 amps (A), respectively, and at this time, the total current required by at least two charging regions (3+5=8 or 5+5=10) is less than the maximal current supply value of 12 amps, so the step 40 is performed to charge each of the above-mentioned charging regions. Next, the steps 32 to 40 are repeated until the mobile electronic devices are fully charged.

With reference of FIGS. 1 and 2, it can be understood that the present invention provides a smart charging method using the domestic power source to supply the charging device with power, and the charging device, such as the charging cabinet or the charging car, is provided with the charging regions which each comprises the sockets configured to charge the mobile electronic devices, and the charging device can include the control circuit to perform the automatic charging control on the mobile electronic devices plugged into the charging regions; during the process of automatic charging control, the inrush current is filtered out first, the current sensors are used to obtain the total current required by the charging regions, and the value of the total current is compared with the maximal current supply value, and when the value of the total current required by at least two charging regions is higher than the maximal current supply value, the charging regions take turn to perform charging operation for the first charging period. When the value of the total current of at least two charging regions is less than the maximal current supply value, the charging regions satisfying the condition and remaining charging region can perform charging operation for the second charging period until the mobile electronic devices are fully charged. As a result, the smart charging method of the present invention can filter out inrush current, and effectively increase the charging efficiency to shorten the charging period of the mobile electronic devices. The smart charging method of the present invention can be applied to the charging cabinet or the charging car and have great market opportunities.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A smart charging method, configured to supply a charging device with power through a power socket by using a domestic power source, wherein the charging device comprises a plurality of charging regions disposed inside thereof, and each of the charging regions comprises a plurality of sockets configured to charge a plurality of mobile electronic devices, and the charging device comprises a control circuit configured to perform automatic charging control on the mobile electronic devices plugged in the charging regions, and the smart charging method comprises:
   (A) turning on a power source of the charging device;
   (B) waiting for a predetermined period in which an inrush current prevention circuit absorbs inrush current;
   (C) by using a plurality of current sensors of the control circuit electrically connected to the inrush current prevention circuit, obtaining total current required by the all charging regions;
   (D) by using a micro control unit electrically connected to the current sensors, determining whether the total current of the all charging regions is higher than a maximal current supply value;
   when the total current of the all charging regions is higher than a maximal current supply value,
       (E) repeatedly turning on and off a plurality of overload relays disposed between the control circuit and the charging regions respectively, by a predetermined number of times;
       (F) resetting the power source by turning off all of the plurality of overload relays, and repeating the steps (A)-(D);
   when the total current of the all charging regions is not higher than a maximal current supply value,
       (G) by turning on all of the overload relays by using the micro control unit, supplying the current required by all of the charging regions for charging;
   (H) determining whether total current of at least two charging regions is higher than the maximal current supply value;
   when the total current of the at least two charging regions is higher than the maximal current supply value,
       (I) by controlling the charging regions, performing a charging operation for a first charging period on the charging regions respectively, and repeating the steps (B)-(D); and
   when the total current of the at least two charging regions is not higher than the maximal current supply value,
       (J) by controlling the at least two charging regions and remaining charging region, performing a charging operation for a second charging period on the at least two charging regions and the remaining charging region respectively, and repeating the steps (B)-(D).

2. The smart charging method according to claim 1, wherein the predetermined period of the step (B) is in a range of 400 milliseconds (ms) to 500 milliseconds (ms).

3. The smart charging method according to claim 1, wherein the control circuit comprises the current sensors, and the overload relays electrically connected between the current sensors and the charging regions, respectively, and the current sensors and the overload relays are electrically connected to the micro control unit, so as to form the control circuit.

4. The smart charging method according to claim 1, wherein the first charging period is in a range of 40 minutes to 50 minutes.

5. The smart charging method according to claim 1, wherein the second charging period is in a range of 20 minutes to 40 minutes.

6. The smart charging method according to claim 1, wherein the maximal current supply value is in a range of 12 amps to 15 amps.

* * * * *